US006982948B2

(12) United States Patent
Kroeger et al.

(10) Patent No.: US 6,982,948 B2
(45) Date of Patent: *Jan. 3, 2006

(54) METHOD AND APPARATUS FOR TRANSMISSION AND RECEPTION OF FM IN-BAND ON-CHANNEL DIGITAL AUDIO BROADCASTING

(75) Inventors: Brian William Kroeger, Sykesville, MD (US); Jeffrey S. Baird, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/342,764

(22) Filed: Jan. 15, 2003

(65) Prior Publication Data

US 2003/0137928 A1    Jul. 24, 2003

Related U.S. Application Data

(63) Continuation of application No. 09/438,148, filed on Nov. 10, 1999, now Pat. No. 6,549,544.

(51) Int. Cl.
*H04J 11/00* (2006.01)
(52) U.S. Cl. .................. 370/208; 370/503; 370/509
(58) Field of Classification Search ............. 370/203, 370/204, 208, 485, 486, 503, 507, 511–513, 370/514, 210, 350, 509, 270; 375/365, 366, 375/367, 368

See application file for complete search history.

(56) References Cited

U.S. PATENT DOCUMENTS 3,488,445 A    1/1970    Chang
4,379,947 A    4/1983    Warner (Continued)

FOREIGN PATENT DOCUMENTS

EP    0 529 421 A2    3/1993

(Continued)

OTHER PUBLICATIONS

M.-G. Kim, "On Systematic Punctured Convolutional Codes," *IEEE Transactions on Communications*, vol. 45, No. 2, Feb. 1997, pp. 133-139.

(Continued)

*Primary Examiner*—Ricky Ngo
*Assistant Examiner*—Duc Duong
(74) *Attorney, Agent, or Firm*—Robert P. Lenart, Esq.; Pietragallo, Bosick & Gordon

(57) ABSTRACT

A transmitter for transmitting data in a digital audio broadcasting system includes a signal generator for providing a plurality of orthogonal frequency division multiplexed sub-carriers, with the sub-carriers including data sub-carriers and reference sub-carriers, and a modulator for modulating the data sub-carriers with a digital signal representative of information to be transmitted. The reference sub-carriers are modulated with a sequence of timing bits, wherein the sequence of timing bits includes an unambiguous block synchronization word, and the number of bits comprising the block synchronization word is less than one half of the number of bits in said timing sequence. The orthogonal frequency division multiplexed sub-carriers are transmitted to receivers that differentially detect the block synchronization word and use the block synchronization word to coherently detect the digital signal representative of information to be transmitted are also included.

30 Claims, 5 Drawing Sheets

U.S. PATENT DOCUMENTS

| | | |
|---|---|---|
| 4,425,642 A | 1/1984 | Moses et al. |
| 4,534,054 A | 8/1985 | Maisel |
| 4,660,193 A | 4/1987 | Young et al. |
| 4,817,116 A | 3/1989 | Akaiwa et al. |
| 4,881,241 A | 11/1989 | Pommier et al. |
| 4,881,245 A | 11/1989 | Walker et al. |
| 5,020,076 A | 5/1991 | Cahill et al. |
| 5,040,217 A | 8/1991 | Brandenburg et al. |
| 5,117,195 A | 5/1992 | Robbins |
| 5,128,933 A | 7/1992 | Baranoff-Rossine |
| 5,134,630 A | 7/1992 | Bateman |
| 5,134,634 A | 7/1992 | Yoshida |
| 5,191,576 A | 3/1993 | Pommier et al. |
| 5,228,025 A | 7/1993 | Le Floch et al. |
| 5,251,232 A | 10/1993 | Nonami |
| 5,265,128 A | 11/1993 | Widmer et al. |
| 5,274,629 A | 12/1993 | Helard et al. |
| 5,278,826 A | 1/1994 | Murphy et al. |
| 5,278,844 A | 1/1994 | Murphy et al. |
| 5,285,498 A | 2/1994 | Johnston |
| 5,311,550 A | 5/1994 | Fouche et al. |
| 5,315,583 A | 5/1994 | Murphy et al. |
| 5,371,548 A | 12/1994 | Williams |
| 5,390,214 A | 2/1995 | Hopkins et al. |
| 5,406,551 A | 4/1995 | Saito et al. |
| 5,465,396 A | 11/1995 | Hunsinger et al. |
| 5,481,614 A | 1/1996 | Johnston |
| 5,499,271 A | 3/1996 | Plenge et al. |
| 5,584,051 A | 12/1996 | Goken |
| 5,592,471 A | 1/1997 | Briskman |
| 5,648,967 A | 7/1997 | Schulz |
| 5,694,389 A * | 12/1997 | Seki et al. .................. 370/208 |
| 5,771,224 A | 6/1998 | Seki et al. |
| 5,812,523 A | 9/1998 | Isaksson et al. |
| 5,903,598 A | 5/1999 | Hunsinger et al. |
| 5,949,796 A | 9/1999 | Kumar |
| 5,949,813 A | 9/1999 | Hunsinger et al. |
| 5,966,401 A | 10/1999 | Kumar |
| 6,400,758 B1 | 6/2002 | Goldston et al. |
| 6,549,544 B1 * | 4/2003 | Kroeger et al. ............. 370/482 |
| 6,556,639 B1 * | 4/2003 | Goldston et al. ........... 375/365 |

FOREIGN PATENT DOCUMENTS

| | | |
|---|---|---|
| WO | WO 95/07581 | 3/1995 |
| WO | WO 99/50980 | 10/1999 |

OTHER PUBLICATIONS

B. W. Kroeger et al., "Robust IBOC DAB AM and FM Technology For Digital Audio Broadcasting," Apr. 1997, pp. 1-12.

B. W. Kroeger et al., "Compatibility of FM Hybrid In-Band On-Channel (IBOC) System For Digital Audio Broadcasting," *IEEE Transactions on Broadcasting*, vol. 43, No. 4, Dec. 1997, pp. 421-430.

B. Kroeger et al., "Robust Modem and Coding Techniques for FM Hybrid IBOC DAB," *IEEE Transactions on Broadcasting*, vol. 43, No. 4, Dec. 1997, pp. 412-420.

R. L. Cupo et al., "An OFDM All Digital In-Band On-Channel (IBOC) AM and FM Radio Solution Using the PAC Encoder," *IEEE Transactions on Broadcasting*, vol. 44, No. 1, Mar. 1998, pp. 22-27.

J. B. Cain et al., "Punctured Convolutional Codes of Rate (n-1)/n and Simplified Maximum Likelihood Decoding," *IEEE Transactions on Information Theory*, vol. IT-25, No. 1, Jan. 1979, pp. 97-100.

Y. Yasuda et al., "High-Rate Punctured Convolutional Codes for Soft Decision Viterbi Decoding," *IEEE Transactions on Communications*, vol. Com-32, No. 3, Mar. 1984, pp. 315-319.

M. Alard et al., "Principles of Modulation and Channel Coding for Digital Broadcasting for Mobile Receivers," *EBU Review—Technical*, No. 224, Aug. 1987, pp. 168-190.

J. Hagenauer, "Rate-Compatible Punctured Convolutional Codes (RCPC Codes) and Their Applications," *IEEE Transactions on Communications*, vol. 36, No. 4, Apr. 1988, pp. 389-400.

C. P. Bell et al., "DAB: Digital Audio Broadcasting Coverage Aspects of a Single Frequency Network," *International Broadcasting Convention*. Conference Publication No. 358, Jul. 1992, pp. 270-276.

S. Kallel, "Complementary Punctured Convolutional (CPC) Codes and Their Applications," *IEEE Transactions on Communications*, vol. 43, No. 6, Jun. 1995, pp. 2005-2009.

A. J. Vigil, "Wireless Data Transmission Through In-Band On-Channel Digital Audio Broadcasting," *SPIE*, vol. 2601, Jun. 1995, pp. 105-114.

B. W. Kroeger et al., "Improved IBOC DAB Technology for AM and FM Broadcasting," Oct. 1996, pp. 1-14.

* cited by examiner

METHOD AND APPARATUS FOR TRANSMISSION AND RECEPTION OF FM IN-BAND ON-CHANNEL DIGITAL AUDIO BROADCASTING

CROSS-REFERENCE TO RELATED APPLICATION

This is a continuation application of U.S. patent application Ser. No. 09/438,148, filed Nov. 10, 1999 now U.S. Pat. No. 6,549,544.

BACKGROUND OF THE INVENTION

This invention relates to methods and apparatus for transmitting and receiving digital data, and more particularly, to such methods and apparatus for use in digital audio broadcasting systems.

Digital Audio Broadcasting (DAB) is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the same spectral mask of an existing AM or FM channel allocation. IBOC DAB promotes economy of spectrum while enabling broadcasters to supply digital quality audio to their present base of listeners.

One hybrid FM IBOC DAB signal combines an analog modulated carrier with a plurality of orthogonal frequency division multiplexed (OFDM) sub-carriers placed in the region from about 129 kHz to about 199 kHz away from the FM center frequency, both above and below the spectrum occupied by an analog modulated host FM carrier. An all-digital IBOC DAB system eliminates the analog modulated host signal while retaining the above sub-carriers and adding additional sub-carriers in the regions from about 100 kHz to about 129 kHz from the FM center frequency. These additional sub-carriers can transmit a backup signal that can be used to produce an output at the receivers in the event of a loss of the main, or core, signal.

The development of high-quality stereo codec algorithms indicates that virtual-CD stereo quality is practical at rates as low as 96 kbps. IBOC requires no new spectral allocations because each DAB signal is simultaneously transmitted within the same spectral mask of an existing allocation. IBOC DAB is designed, through power level and spectral occupancy, to be transparent to the analog radio listener. IBOC promotes economy of spectrum while enabling broadcasters to supply digital quality audio to their present base of listeners. An FM IBOC system is described in a commonly owned patent application entitled "FM In-Band On-Channel Digital Audio Broadcasting Method And System", Ser. No. 09/049,210, filed Mar. 27, 1998, now U.S. Pat. No. 6,108,810.

IBOC DAB signals may be subject to interference from adjacent channels, or interference from the co-channel analog transmission. It is desirable to provide an IBOC DAB system that is tolerant of such interference even in a multiple station, strong-signal urban market, while being able to transmit the digital information at a reduced symbol rate.

SUMMARY OF THE INVENTION

Transmitter for transmitting data in a digital audio broadcasting system includes means for producing a plurality of orthogonal frequency division multiplexed sub-carriers, with the sub-carriers including data sub-carriers and reference sub-carriers, and modulating the data sub-carriers with a digital signal representative of information to be transmitted. The reference sub-carriers are modulated with a sequence of timing bits including an unambiguous block synchronization word, and the number of bits comprising the block synchronization word is less than one half of the number of bits in said timing sequence. Then the orthogonal frequency division multiplexed sub-carriers are transmitted. Receivers that differentially detect the block synchronization word and use the block synchronization word to coherently detect the digital signal representative of information to be transmitted, are also included.

DESCRIPTION OF THE PREFERRED EMBODIMENTS

Figure 1:
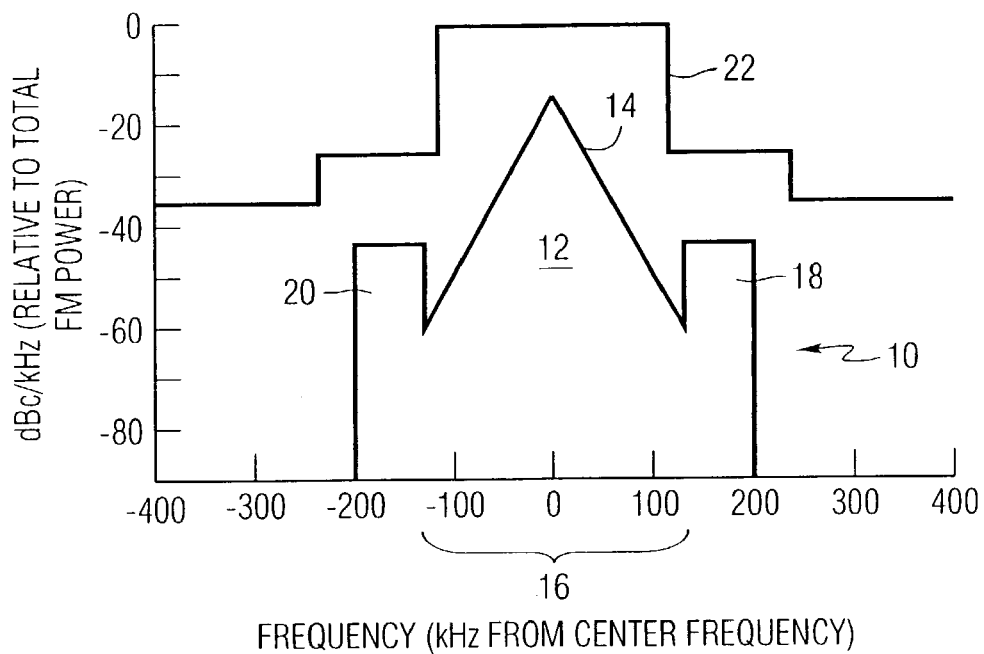
FIG. 1 is a schematic representation of the frequency allocations and relative power spectral density of the signal components for a hybrid FM IBOC DAB signal.

Referring to the drawings, FIG. 1 is a schematic representation of the frequency allocations (spectral placement) and relative power spectral density of the signal components for a hybrid FM IBOC DAB signal 10 in accordance with the present invention. The hybrid format includes the conventional FM stereo analog signal 12 having a power spectral density represented by the triangular shape 14 positioned in a central frequency band 16 portion of the channel. The Power Spectral Density (PSD) of a typical analog FM broadcast signal is nearly triangular with a slope of about −0.35 dB/kHz from the center frequency. A plurality of digitally modulated evenly spaced sub-carriers are positioned on either side of the analog FM signal, in an upper sideband 18 and a lower sideband 20, and are transmitted concurrently with the analog FM signal. All of the carriers are transmitted at a power level that falls within the United States Federal Communications Commission channel mask 22. The vertical axis in FIG. 1 shows the peak power spectral density as opposed to a more conventional average power spectral density characterization.

The power spectral density (PSD) of a typical FM broadcast signal has been measured to be nearly triangular in dB with a slope of about −0.36 dB/kHz from the center frequency. First adjacent FM signals, if present, would be centered at a spacing of 200 kHz.

The total FM power can be found by integrating the triangular power spectral density.

$$P_{total} = \int_{-\infty}^{\infty} P_{peak} \cdot 10^{-0.36|f|/10} \cdot df = 24.12747 \cdot P_{peak}, \text{ or } P_{peak\_dB} - 13.8 \text{ dB}$$

The peak of the ideal triangular FM power spectral density is located 13.8 dB below the total carrier power reference level (0 dBc) as shown in FIG. 1. The DAB power level on each side of the FM spectrum is placed 25 dB below the total FM power (this −25 dBc value may be adjustable to accommodate special interference situations). The DAB density in a 1 kHz bandwidth can be calculated. The power spectral density of the DAB signal can be approximated by dividing its total power (−22 dB) by its bandwidth (140 kHz).

$$PSD_{DAB} = -22 - 10 \cdot \log(140) = -43.46 \text{ dBc/kHz}$$

The baseline Hybrid DAB system has 191 subcarriers above and subcarriers 191 below the host FM spectrum. Each DAB subcarrier is QPSK modulated. The in-phase and quadrature pulse shapes are root raised cosine tapered (excess time=7/128) at the edges to suppress the spectral sidelobes. Although this pulse shape reduces the throughput capacity relative to the rectangular pulse by 5.2%, performance in multipath is improved and the resulting spectral sidelobes are reduced, lowering interference. In the baseline FM IBOC design, 191 OFDM subcarriers are placed on each side of the host FM signal occupying the spectrum from about 129 kHz through 199 kHz away from the host FM center frequency.

Figure 2:
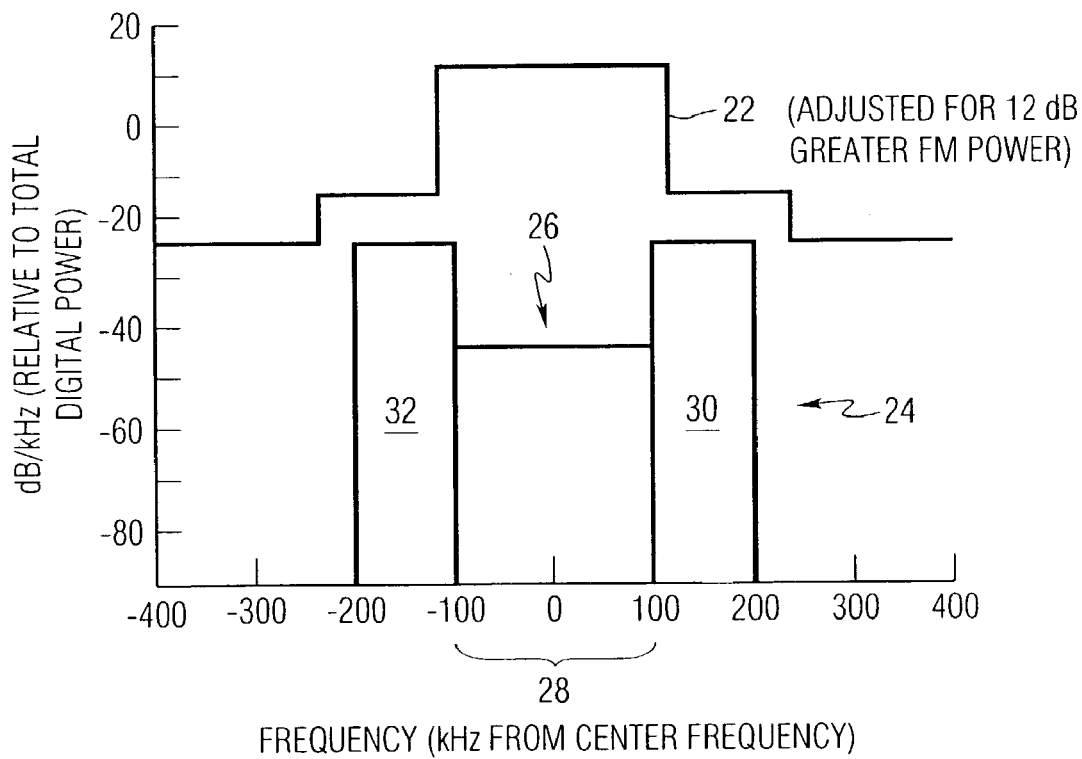
FIG. 2 is a schematic representation of the frequency allocations and relative power spectral density of the signal components for an all-digital FM IBOC DAB signal.

The digitally modulated portion of the hybrid signal is a subset of the all-digital DAB signal that will be transmitted in the all-digital IBOC DAB format. The spectral placement and relative signal power density levels of the OFDM digital sub-carriers in a proposed all-digital FM DAB format illustrated by item number 24, is shown in FIG. 2. The analog FM signal of FIG. 1 has been replaced by an optional additional group of OFDM sub-carriers, referred to as the extended all-digital signal 26, located in the central frequency band 28. Once again evenly spaced OFDM subcarriers are positioned in an upper sideband 30 and a lower sideband 32. The sidebands of the all-digital format of FIG. 2 are wider than the sidebands of FIG. 1. In addition, the power spectral density level of the all-digital IBOC signal sidebands is set about 10 dB higher than that allowed in the hybrid IBOC sidebands. This provides the all-digital IBOC signal with a significant performance advantage. Furthermore the power spectral density of the extended all-digital signal is about 15 dB below that of the hybrid IBOC sidebands. This minimizes or eliminates any interference problems to adjacent hybrid or all-digital IBOC signals while providing additional capacity for other digital services.

Figure 3:
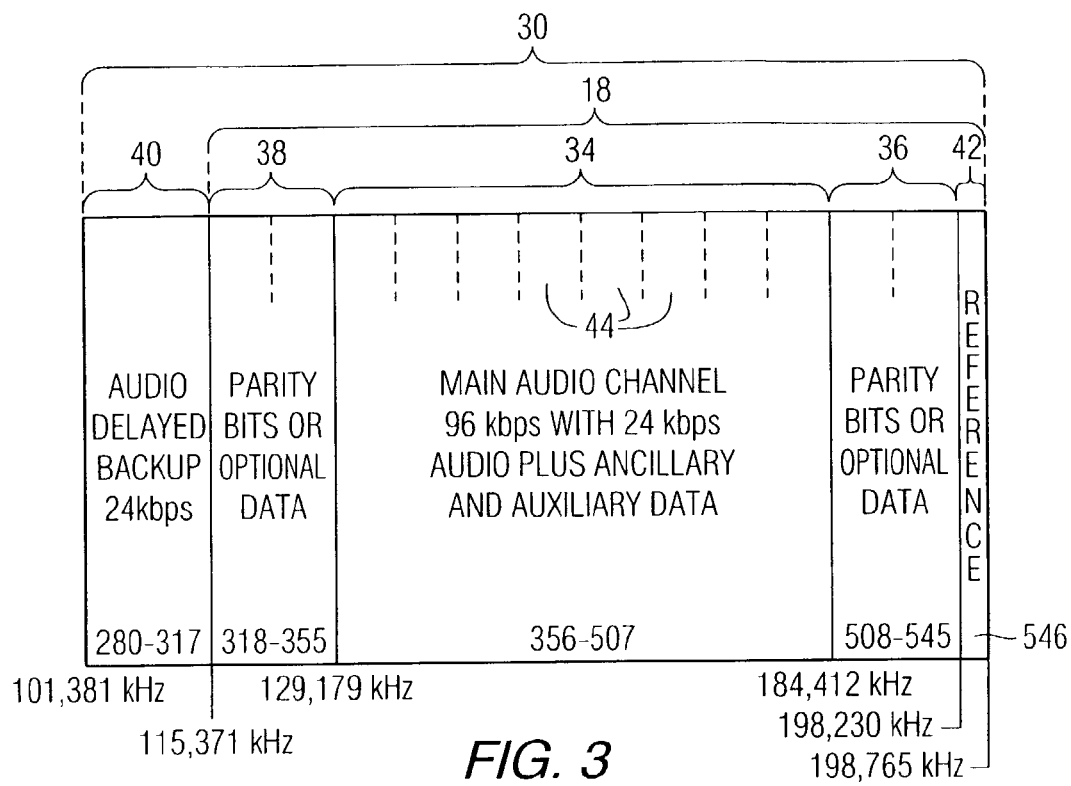
FIG. 3 is a schematic representation of the frequency allocations for the upper sideband of the FM IBOC DAB signal in accordance with the present invention.

FIG. 3 is a schematic representation of the placement of the signal components for the upper sideband of an FM IBOC DAB signal in accordance with the present invention.

The total DAB power in each sideband is set to about −25 dB relative to its host FM power. The individual OFDM subcarriers are QPSK modulated at 344.53125 Hz (44100/128) and are orthogonally spaced at about 363.3728 Hz (44100*135/8192) after pulse shaping is applied (root raised cosine time pulse with 7/128 excess time functions as guard time). The potential subcarrier locations are indexed from zero at the FM center frequency to plus or minus 550 at the edges of the 400 kHz bandwidth. The outside assigned subcarriers are at plus or minus 546 with a center frequency of plus or minus 198402 Hz. The inside information bearing subcarriers of the baseline system are located at plus or minus 356 with center frequencies of plus or minus 129361 Hz. Reference subcarriers are spaced 19 subcarriers apart starting from location 356 through 546 on either sideband. These reference subcarriers are used to establish a phase reference for coherent detection of the other information-bearing subcarriers. The reference subcarriers are also used for frame synchronization and channel state information (CSI) estimation.

Subcarriers 356 through 507 carry about 96 kbps of information. Subcarriers 508 through 545 can carry an additional 24 kbps of information bits to create an effective code rate of R=4/5 on each side of the FM signal. The placement of digitally modulated subcarriers at ±15 kHz about 114 kHz is avoided in the baseline system in order to reduce the noise introduced into inadequately filtered receivers. However the broadcaster will have the option to utilize this portion of the spectrum to improve robustness of the digital audio signal and/or to provide additional datacasting capacity. This option is attractive if the broadcaster avoids stereo operation of the FM signal.

The upper sideband 30 represented in FIG. 3, is comprised of information-bearing sub-carriers 280 through 546 corresponding to subcarrier frequencies 101,381 Hz through 198,765 Hz. Sub-carrier 546 is a reference sub-carrier. The upper sideband is shown to be divided into several groups 34, 36, 38 and 40. Group 34 represents the main channel and contains sub-carriers 356 through 507. The main channel sub-carriers are used to transmit the program material to be broadcast in the form of data bits of the coding algorithm at a rate of at least 96 thousand bits per second (kbps). The main channel may include ancillary and auxiliary data. A second group of carriers 36 occupying sub-carrier positions 508 through 545 are used to transmit parity bits. These sub-carriers are more likely to be corrupted by interferers than sub-carriers that are positioned closer to the center of the channel. The most expendable code bits are placed on the outer OFDM sub-carriers. The expendable bits contribute least to the free distance or coding gain of the combined code and they are least important to the error correction ability of the code. Therefore, the most vulnerable sub-carriers are used to carry these expendable bits.

Another group of sub-carriers 38 is used in the all-digital embodiment of the invention to carry parity bits or optional data. This group of subcarriers may be used in the hybrid embodiment, if the analog signal in the central frequency band is scaled back, for example by removing stereo information. Sub-carrier group 40 includes sub-carrier positions 280 through 317 and is used in the all-digital embodiment to transmit a delayed backup version of the program material at a lower data rate, of for example 24 kbps. The sub-carriers in this group would not be used in the hybrid embodiment unless the analog base band signal is further scaled back. In the all-digital embodiment, the sub-carriers of group 40 provide data that can be used in the event of a loss of the signal transmitted in the main channel. The sub-carrier at location 546 represents a reference signal 42. The sub-carriers in the upper DAB sideband are partitioned into groups 44 of 19 sub-carriers each, with sub-carrier 0 of each group being a reference sub-carrier.

Figure 4:
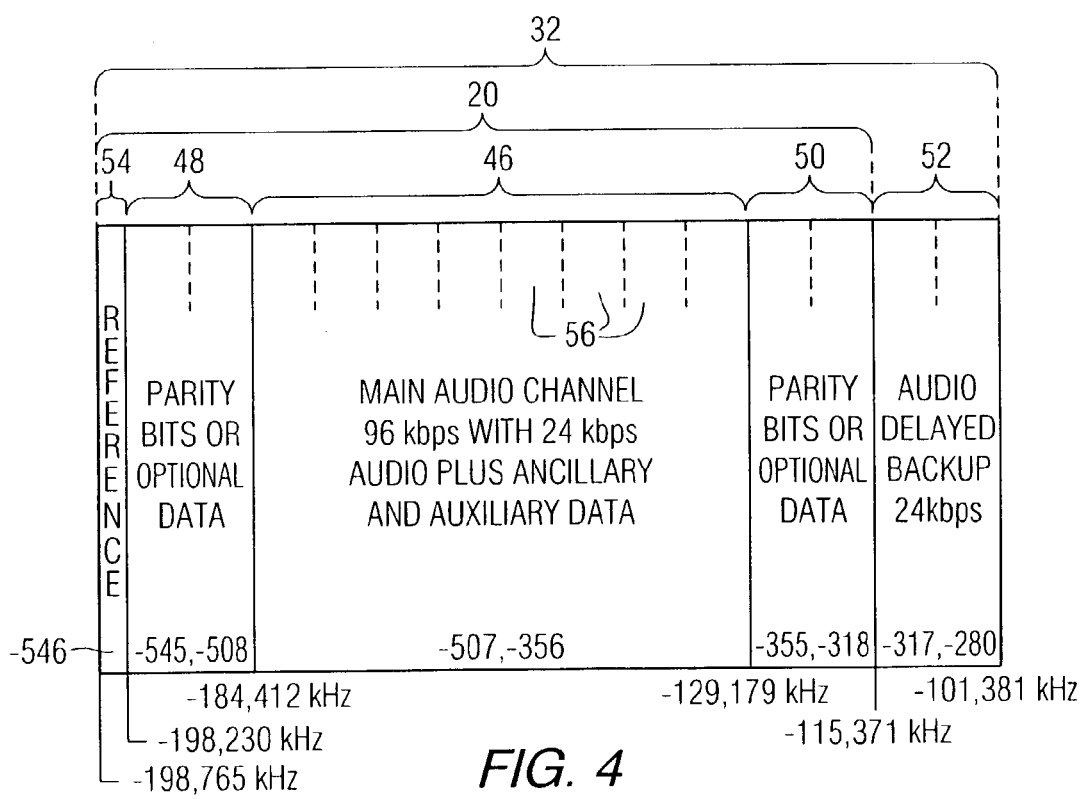
FIG. 4 is a schematic representation of the frequency allocations for the lower sideband of the FM IBOC DAB signal in accordance with the present invention.

The sub-carrier placement in the lower sideband shown in FIG. 4, represents a mirror image of the sub-carrier placement in the upper sideband format with negative indexes and frequencies. Lower sideband main channel 46 contains the sub-carriers at locations −356 through −507 and is used to transmit the same program material as is transmitted in the upper sideband main channel, but using punctured convolutional coding that is complementary to that used in the upper FDAB sideband. The sub-carriers in groups 48, 50 and 52 are utilized in the same manner as the sub-carriers of group 36, 38 and 40 of the upper sideband. The sub-carrier in position −546 may be used to transmit a reference signal 54. The sub-carriers in the upper DAB sideband are partitioned into groups 56 of 19 sub-carriers each, with sub-carrier 0 of each group being a reference sub-carrier.

The sub-carriers in both sidebands use orthogonal frequency division multiplexing and are FEC coded using Complementary Punctured Convolution (CPC) codes. CPC codes are known in the art, for example, see S. Kallel, "Complementary Punctured Convolution (CPC) Codes and Their Applications," IEEE Trans. Comm., Vol. 43, No. 6, pp. 2005–2009, June, 1995. The 96 kbps main channel is formatted identically in both the hybrid and all-digital systems. This main channel is coded over both DAB sidebands using CPC codes, resulting in a rate 1/2 CPC code.

Sub-carriers 508 through 545 (upper and lower sidebands) carry either additional parity bits for the CPC code, or data in both hybrid and all-digital systems. The transmission of parity bits here improves the FEC code rate over the main channel from R=1/2 to R=2/5, or R=4/5 on each sideband independently. In the presence of adjacent channel FM interference, these outer OFDM sub-carriers are most vulnerable to corruption, and the interference on the upper and lower sidebands is independent. Since the power spectral density (PSD) of an FM broadcast signal is nearly triangular, then the interference increases as the OFDM sub-carriers approach the frequency of a first adjacent signal. When parity bits are transmitted, the coding and interleaving may be specially tailored to deal with this nonuniform interference such that the communication of information is robust.

Sub-carriers 318 through 355 in group 38 of the upper sideband and sub-carriers −318 through −355 in group 50 of the lower sideband can carry either additional parity bits for the CPC code, or data. This selection is optional in the hybrid system, but mandatory in the all-digital system. The transmission of parity bits here improves the FEC code rate over the main channel from R=1/2 to R=2/5, or R=4/5 on each independent DAB sideband. If parity bits are transmitted in both regions 318 through 355 and 508 through 545 (and corresponding sub-carriers in the lower sideband), then the overall code rate is R=1/3, or R=2/3 on each independent DAB sideband.

The all-digital system will utilize sub-carriers 280 through 317 in group 40 of the upper sideband and sub-carriers −280 through −317 of the lower sideband to carry a lower data rate version of the data in the main channel, e.g. 24 kbps embedded code. This lower rate backup data is delayed to enhance performance using time diversity. This backup data of the all-digital system replaces the analog FM blend of the hybrid system which is described in commonly owned co-pending application "A System And Method For Mitigating Intermittent Interruption In An Audio Radio Broadcast System", filed Oct. 9, 1997, Ser. No. 08/947,902, now U.S. Pat. No. 6,178,317. When the Main Channel data is corrupted, the backup data can fill-in the audio segment. Since the backup data is comprised of an embedded subset of the main channel data bits, the backup can enable additional error protection for the main channel.

In the all-digital embodiment, sub-carriers from index −279 to 279 which are located in the central frequency band 28 in FIG. 2, can be used as an option to extend DAB capacity. The channel bit rate over this "extended" bandwidth without coding is about 384 kbps. Because half of this bandwidth can be corrupted by a first adjacent DAB signal, the CPC FEC coding technique should be applied to each half of the extended bandwidth, i.e. sub-carriers 1 through 279 should carry the same information as sub-carriers −1 through −279. Then, if either half becomes corrupted, there will still be a rate 2/3 complementary code on the remaining half. In this case, the information capacity after rate 1/3 coding is about 128 kbps.

The extended all-digital band is exposed to interference only from a first-adjacent hybrid or all-digital interferer. Under present protected contour guidelines, the maximum level of the first adjacent interferer is −6 dB relative to the host station. If this first adjacent interferer is an all-digital IBOC, then the interferer can be up to 14 dB higher than the level of that half of the extended band. The extended band starts to positively contribute to the coding gain when the spectral density of the interferer is about the same level as the extended band signal. This implies that an all-digital first adjacent interferer must be at least 20 dB below the signal of interest (20 dB di/du) before that half of the extended band is useful. Reception of the extended data might be possible with both first adjacents present at −20 dB; however robust reception in fading probably requires at least one first adjacent at −30 dB or lower.

In the presence of adjacent channel interference, the outer OFDM subcarriers are most vulnerable to corruption, and the interference on the upper and lower sidebands is independent. Since the PSD of an FM broadcast signal is nearly triangular, then the interference increases as the OFDM subcarriers approach the frequency of a first adjacent signal. The coding and interleaving are specially tailored to deal with this nonuniform interference such that the communication of information is robust.

The IBOC DAB system will transmit all the digital audio information on each DAB sideband (upper or lower) of the FM carrier. Although additional sub-carriers beyond the baseline system can be activated to enable the transmission of all the code bits of the rate 1/3 FEC code, the baseline system employs a code rate of 2/5. Each sideband can be detected and decoded independently with an FEC coding gain achieved by a rate 4/5 (optionally rate 2/3) convolutional code. An optional Reed Solomon code (144,140, GF(8)) outer code can also be applied. Further error detection capability is provided with an 8-bit CRC on each audio or data field. The dual sideband redundancy permits operation on one sideband while the other is completely corrupted. However, usually both sides are combined to provide additional signal power and coding gain. Special techniques can be employed to demodulate and separate strong first adjacent interferers such that "recovered" DAB sidebands can be successfully combined to tolerate large first adjacent interferers.

The reference subcarriers are modulated with a repeating 32-bit BPSK timing sequence, which is differentially encoded prior to transmission. The reference subcarriers serve multiple purposes: 1) resolution of subcarrier ambiguity on acquisition, 2) local phase reference for subsequent coherent detection, 3) local noise and/or interference samples for estimation of channel state information (CSI), and 4) phase error information for frequency and symbol tracking. Differential coding of the BPSK timing sequence permits detection of the BPSK timing sequence prior to establishment of the coherent reference needed for the remaining subcarriers. The differentially detected pattern is then used to remove the data modulation from the reference subcarriers, leaving information about the local phase of the reference as well as noise or interference samples. This is used to estimate the CSI needed for subsequent soft-decision decoding.

Figure 5:
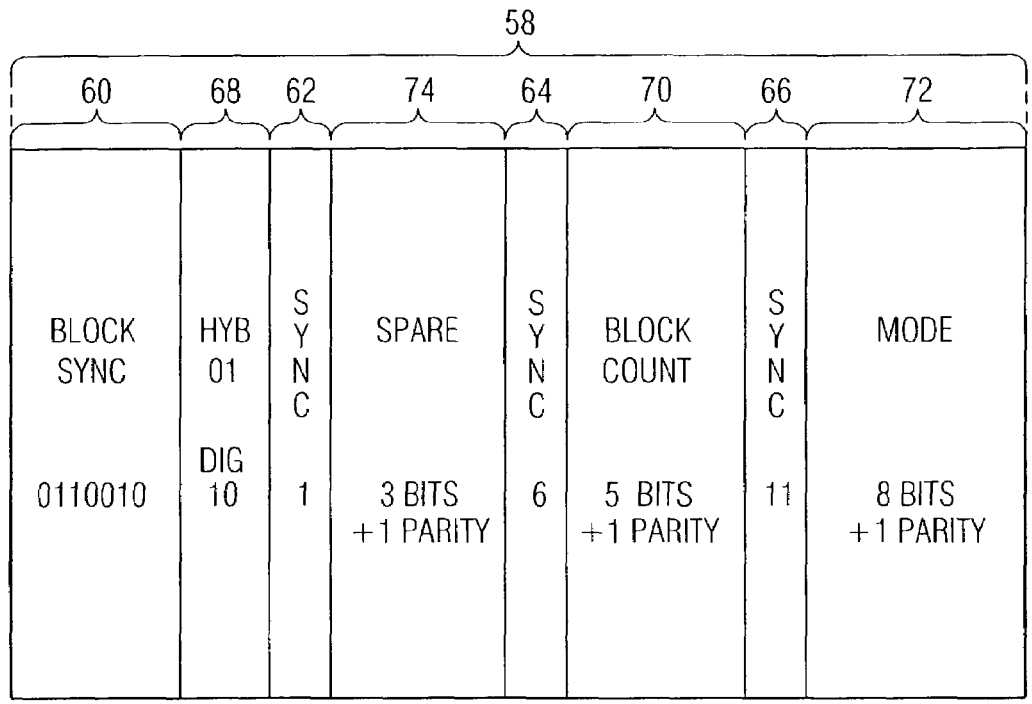
FIG. 5 is a schematic representation of BPSK timing sequence used in the preferred embodiment of the present invention.

The reference carriers are used to transmit a BPSK timing sequence 58 (prior to differential coding) as shown in FIG. 5. The preferred embodiment of the invention uses a 32 bit timing sequence. Eleven of the 32 bits are fixed for block synchronization purposes. A block synchronization word (or pattern) is placed in non-contiguous fields 60, 62, 64 and 66. Field 60 includes seven bits, fields 62 and 64 each include one bit, and field 66 includes two bits. The 11 bits of the block synchronization pattern are sufficient for uniquely defining the boundaries of each block, regardless of the values of the remaining 21 bits. The block synchronization pattern uniquely defines the block boundaries. The timing sequence also includes a hybrid/digital field 68, a block count field 70, a mode field 72 and a spare field 74. The block count field can accommodate a modem frame size of up to 32 blocks. The mode field can accommodate up to 256 modes. The four variable fields in the BPSK timing sequence (hybrid/digital, spare, block count, and mode) are parity checked for both error protection and to eliminate phase reference changes at the end of each variable field due to differential encoding. The same BPSK timing is imposed on all reference sub-carriers.

Block synchronization is established by recognition of a unique binary pattern of bits contained within the BPSK timing sequence. The BPSK timing sequence also contains some other information including a block count field, a mode field and some spare bits for future expansion. A common technique for block or frame synchronization is to employ a "unique word" that can be detected by crosscorrelating the received sequence with the reference unique word. A special property of the unique word is that it should not occur within any valid data pattern within the BPSK timing sequence. This would often require that the data be coded such that the unique word pattern is an invalid data sequence. Sometimes the data coding is avoided in favor of a sufficiently long unique word such that the probability of its occurrence within the data is acceptably small. The sequence is redundantly transmitted at all reference subcarrier locations and is coincident with the block of the interleaver defined in the block count field.

In the preferred embodiment of this invention, the total length (i.e. 32) of the BPSK Timing Sequence is relatively small to start with. It is desirable to use more than half of the 32 bits for information fields (i.e. Mode, Block Count, etc.). If the unique word were conventionally defined as a sequence of contiguous bits, then the length of this unique word must be greater than half the length of the 32-bit sequence. This would prevent the possible occurrence of the unique word within the data portion of the BPSK Timing Sequence. Furthermore, the unique word would be a binary sequence with low autocorrelation values (e.g. Barker-like code) such that partial correlations with the unique word and the data fields would not result in a false correlation. Maximum-length binary sequences are also commonly used to minimize autocorrelation properties of cyclically shifted sequences; however, all the bits would be defined in the maximum-length case such that variable fields are not accommodated.

It is shown here that it is possible to minimize the length of the block sync field by carefully distributing the bits over the length of the entire BPSK timing sequence (instead of a contiguous distribution of the block sync bits). Consider a BPSK timing sequence of total length L with a block sync field of length S. Further assume that Z of the block sync bits are assigned a logic zero value. Then the remaining S-Z block sync bits are a logic one. Cyclic shifts of the BPSK timing sequence are crosscorrelated with the block sync pattern to examine L possible correlation values, ignoring "blank" locations for unassigned bits. Of course the correlation value (number of matching bits) when the pattern matches is S.

If the block sync bits can be distributed such that there is at least one bit mismatch at every correlation offset except at zero offset, then the block sync pattern is unambiguous. An upper bound on the length L of the BPSK timing sequence with an unambiguous block sync pattern can be determined as a function of block sync length of S $$L \leq 2 \cdot Z(S-Z)+1$$

bits and Z.

Furthermore L is maximized as a function of S only when the bits of the block sync pattern are distributed nearly evenly between logic ones and zeros.

$$L \leq \begin{cases} \frac{S^2}{2} + 1; & S \text{ even} \\ \frac{S^2}{2} + \frac{1}{2}; & S \text{ odd} \end{cases}$$

Using the above inequality, a BPSK timing sequence of length L=32 bits requires a block sync pattern of no less than S=8 bits to guarantee nonambiguity. In fact a pattern of exactly S=8 bits was found that meets this minimum bound. This minimum block sync pattern is defined with 1's and 0's in the appropriate locations, and X's in the don't care positions.

Minimum block sync pattern:
0X10XX0XX1XXXX0XXXXXX11XXXXXXXXX

Three additional bits were also fixed in the block sync pattern; this decreases the probability of false detection when bit errors occur.

Block sync pattern:
0110010XX1XXXX0XXXXXX11XXXXXXXXX

The differentially encoded BPSK timing sequence is mapped onto the QPSK reference subcarriers by assigning a BPSK logic "1" (after differential encoding) to a QPSK bit pair "1,1", and a BPSK logic "0" (after differential encoding) to a QPSK bit pair "0,0". BPSK is chosen for the reference subcarriers since it is more tolerant of noise and channel impairments than differentially detected QPSK. Furthermore, the redundancy of the BPSK timing sequence over all reference subcarriers yields a robust reference even under the most severe interference and channel conditions.

Figure 6:
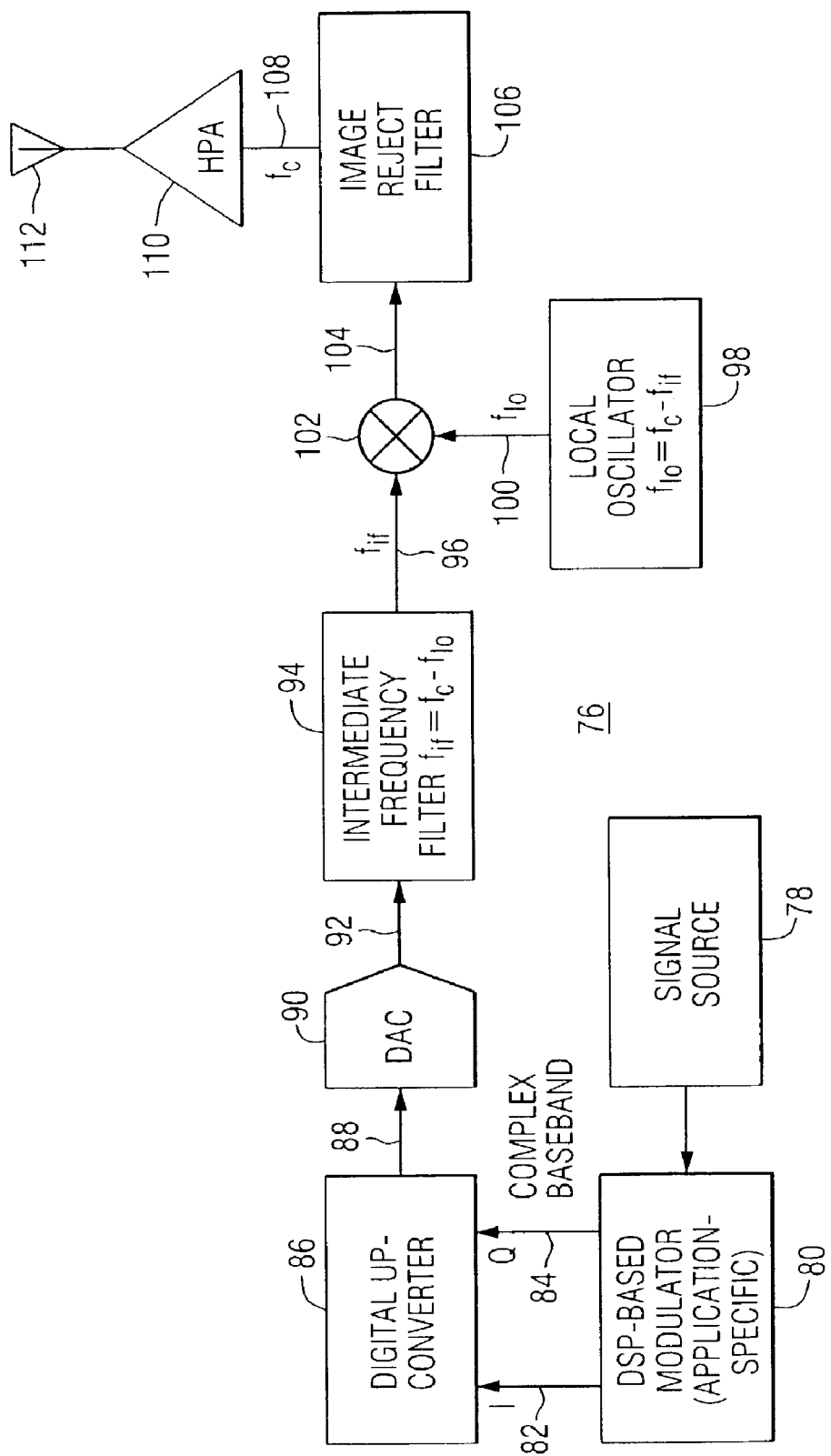
FIG. 6 is a block diagram of a transmitter for use in a digital audio broadcasting system that can transit signals formatted in accordance with this invention.

FIG. 6 is a block diagram of a DAB transmitter 76, which can broadcast digital audio broadcasting signals in accordance with the present invention. A signal source 78 provides the signal to be transmitted. The source signal may take many forms, for example, an analog program signal that may represent voice or music and/or a digital information signal that may represent message data such as traffic information. A digital signal processor (DSP) based modulator 80 processes the source signal in accordance with various known signal processing techniques, such as source coding, interleaving and forward error correction, to produce in-phase and quadrature components of a complex base band signal on lines 82 and 84. The signal components are shifted up in frequency, filtered and interpolated to a higher sampling rate in up-converter block 86. This produces digital samples at a rate $f_s$, on intermediate frequency signal $f_{if}$ on line 88. Digital-to-analog converter 90 converts the signal to an analog signal on line 92. An intermediate frequency filter 94 rejects alias frequencies to produce the intermediate frequency signal $f_{if}$ on line 96. A local oscillator 98 produces a signal $f_{lo}$ on line 100, which is mixed with the intermediate frequency signal on line 96 by mixer 102 to produce sum and difference signals on line 104. The sum signal and other unwanted intermodulation components and noise are rejected by image reject filter 106 to produce the modulated carrier signal $f_c$ on line 108. A high power amplifier 110 then sends this signal to an antenna 112.

Figure 7:
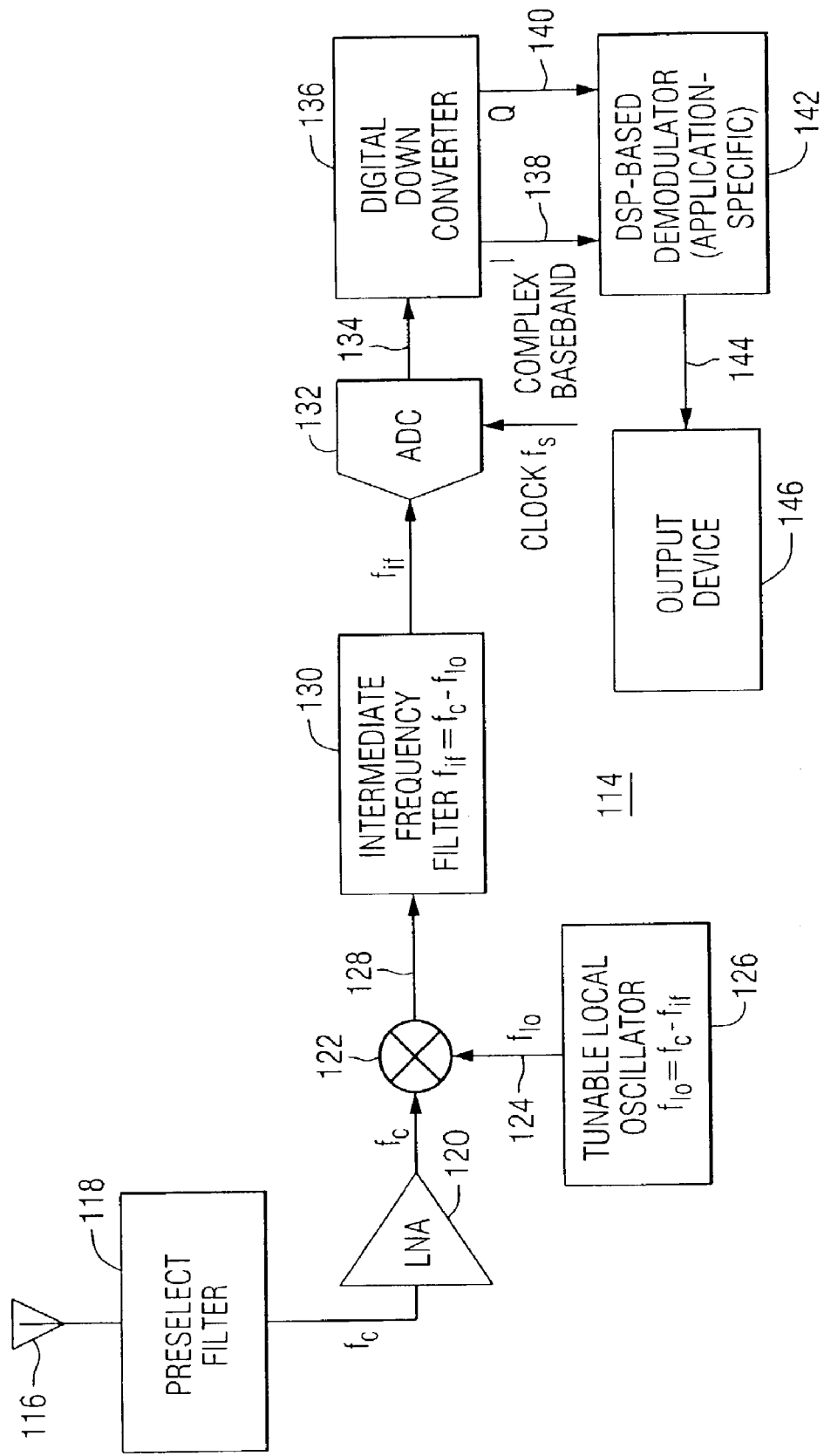
FIG. 7 is a functional block diagram of a receiver for use in a digital audio broadcasting system that can receive signals formatted in accordance with this invention.

The receiver performs the inverse of some of the functions described for the transmitter. FIG. 7 is a block diagram of a radio receiver 114 capable of performing the signal processing in accordance with this invention. The DAB signal is received on antenna 116. A bandpass preselect filter 118 passes the frequency band of interest, including the desired signal at frequency $f_c$, but rejects the image signal at $f_c-2f_{if}$ (for a low side lobe injection local oscillator). Low noise amplifier 120 amplifies the signal. The amplified signal is mixed in mixer 122 with a local oscillator signal $f_{lo}$ supplied on line 124 by a tunable local oscillator 126. This creates sum $(f_c+f_{lo})$ and difference $(f_c-f_{lo})$ signals on line 128. Intermediate frequency filter 130 passes the intermediate frequency signal $f_{if}$ and attenuates frequencies outside of the bandwidth of the modulated signal of interest. An analog-to-digital converter 132 operates using a clock signal $f_s$ to produce digital samples on line 134 at a rate $f_s$. Digital down converter 136 frequency shifts, filters and decimates the signal to produce lower sample rate in-phase and quadrature signals on lines 138 and 140. A digital signal processor based demodulator 142 then provides additional signal processing to produce an output signal on line 144 for output device 146.

Figure 8:
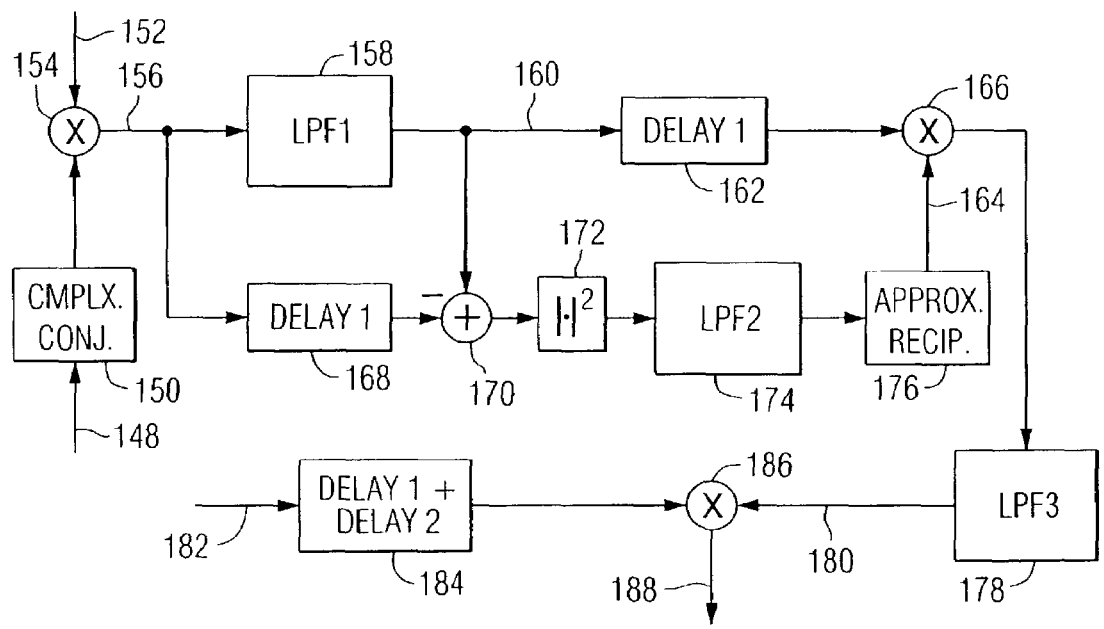
FIG. 8 is a block diagram showing the channel state estimation technique used in the receiver of FIG. 7.

Soft-decision Viterbi decoding with weighting and maximum ratio combining (MRC) for coherently detected QPSK subcarrier symbols is employed to minimize losses over the channel. Since the interference and signal levels vary over the subcarriers (frequency) and time due to selective fading, timely channel state information (CSI) is needed to adaptively adjust the weighting for the soft-symbols. The CSI estimation technique should be designed to accommodate a fading bandwidth of up to about 13 Hz for maximum vehicle speeds in the FM band around 100 MHz. A Doppler spread of several microseconds is typical, although larger spreads have been measured in some environments. A functional block diagram of the technique for estimating both the phase reference and the CSI from the reference subcarriers is illustrated in FIG. 8. This CSI weight combines the amplitude weighting for maximum ratio combining (MRC) along with a phase correction for channel phase errors.

$$CSIweight = \frac{\hat{a}^*}{\hat{\sigma}^2},$$

where $\alpha^*$ is an estimate of the complex conjugate of the channel gain and $\sigma^2$ is an estimate of the variance of the phase noise.

The operation of the CSI recovery technique of FIG. 8 assumes acquisition and tracking of the frequency of the subcarriers, and the symbol timing of the OFDM symbols. The frequency and symbol timing acquisition techniques exploit properties of the cyclic prefix. The frequency and symbol tracking is accomplished through observation of the phase drift from symbol to symbol over time or frequency (across subcarriers).

After acquisition of both frequency and symbol timing, synchronization to the block sync pattern of the BPSK timing sequence is attempted by crosscorrelating the differentially detected BPSK sequence with the block sync pattern. The differential detection is performed over all subcarriers assuming that the location of the training subcarriers is initially unknown. A crosscorrelation of the known block sync pattern with the detected bits of each subcarrier is performed. A subcarrier correlation is declared when a match of all 11 bits of the block sync pattern is detected. Block synchronization (and subcarrier ambiguity resolution) is established when the number of subcarrier correlations meets or exceeds the threshold criteria (e.g. 4 subcarrier correlations spaced a multiple of 19 subcarriers apart).

After block sync is established the variable fields in the BPSK timing sequence can be decoded. The differentially detected bits of these variable fields are decided on a majority vote basis across the training subcarriers such that decoding is possible when some of these subcarriers or bits are corrupted. The 16 blocks within each modem frame are numbered sequentially from 0 to 15. Then the MSB of the block count field is always set to zero since the block count never exceeds 15. Modem frame synchronization is established with knowledge of the block count field.

The coherent detection of this signal requires a coherent phase reference. The decoded information from the BPSK timing sequence is used to remove the modulation from the training subcarriers leaving information about the local phase reference and noise. Referring to FIG. 8, the complex training symbols carried by the reference subcarriers are input on line 148 and the complex conjugate of the symbols is taken as shown in block 150. The complex conjugate is multiplied with a known training sequence on line 152 by multiplier 154. This removes the binary (+/−1) timing sequence modulation from the received training subcarriers by multiplying them by the synchronized and, decoded, and differentially-reencoded BPSK timing sequence. The resulting symbols on line 156 are processed by a finite impulse response (FIR) filter 158 to smooth the resulting symbols over time, yielding a complex conjugated estimate of the local phase and amplitude on line 160. This value is delayed by time delay 162 and multiplied by an estimate of the reciprocal of the noise variance on line 164 by multiplier 166. The noise variance is estimated by subtracting the smoothed estimate of the local phase and amplitude on line 160 from the input symbols (after appropriate time alignment provided by delay 168) at summation point 170. Then squaring the result as shown by block 172, and filtering the complex noise samples as illustrated by block 174. The reciprocal is approximated (with divide-by-zero protection) as shown by block 176. This CSI weight is interpolated over the 18 subcarriers between pairs of adjacent training subcarriers as illustrated by block 178 to produce resulting local CSI weights on line 180. These CSI weights are then used to multiply the corresponding local data-bearing symbols received on line 182, after they have been appropriately delayed as shown in block 184. Multiplier 186 then produces the soft decision output on line 188.

This invention provides a robust In-Band On-Channel (IBOC) Digital Audio Broadcast (DAB) System for improved performance over existing AM and FM broadcasting. The invention is both forward and backward compatible without the allocation of additional channel spectrum. Broadcasters can simultaneously transmit both analog and digital signals within the allocated channel mask allowing full compatibility with existing analog receivers. The invention also allows broadcasters to transmit an all-digital signal, replacing the hybrid analog/digital signal. It is also tolerant of interference from adjacent channels, or interference from the co-channel analog transmission, even in a multiple station, strong-signal urban market. The reference subcarriers are used for multiple purposes including acquisition, tracking, and estimation of channel state information (CSI) and coherent operation.

While the present invention has been described in terms of its preferred embodiment, it will be understood by those skilled in the art that various modifications can be made to the disclosed embodiment without departing from the scope of the invention as set forth in the claims.

What is claimed is:

1. A transmitter for transmitting data in a digital audio broadcasting system comprising:
    means for providing a plurality of orthogonal frequency division multiplexed sub-carriers, said sub-carriers including data sub-carriers and reference sub-carriers;
    means for modulating said data sub-carriers with a digital signal representative of information to be transmitted, and for modulating said reference sub-carriers with a sequence of timing bits, said sequence of timing bits including an unambiguous block synchronization word, wherein number of bits comprising said block synchronization word is less than one half of the number of bits in said timing sequence; and
    means for transmitting said orthogonal frequency division multiplexed sub-carriers.

2. The transmitter of claim 1, wherein said reference sub-carriers are differentially encoded.

3. The transmitter of claim 1, wherein said block synchronization word is comprised of:
    a plurality of block synchronization bits positioned in non-contiguous block synchronization fields.

4. The transmitter of claim 3, wherein said block synchronization word is distributed in said sequence of timing bits such that when the bits of said sequence of timing bits are correlated with a known training sequence of bits, there is at least one bit mismatch at every correlation offset except zero.

5. The transmitter of claim 1, wherein said sequence of timing bits further includes:
    a block count field;
    a mode field; and
    a hybrid/digital field.

6. The transmitter of claim 1, wherein the number of bits (L) in said sequence of timing bits is defined as:

$$L \leq 2 \cdot Z \cdot (S-Z)+1,$$

where Z is the number of logic zero bits in said block synchronization word, and S is the number of bits in said block synchronization word.

7. The transmitter of claim 1, wherein the number of logic zero bits in said block synchronization word is equal to the number of logic one bits in said block synchronization word.

8. A receiver for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising:
    means for differentially detecting said block synchronization word;
    means for using said block synchronization word to coherently detect said digital signal representative of information to be transmitted;
    wherein the block synchronization word is unambiguous and wherein the number of bits comprising said block synchronization word is less than one half of the number of bits in said timing sequence.

9. A receiver for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising:
    means for differentially detecting said block synchronization word;
    means for using said block synchronization word to coherently detect said digital signal representative of information to be transmitted;
    means for processing the sequence of timing bits to determine channel state information;
    means for interpolating the channel state information over a group of said data sub-carriers between two of said reference sub-carriers to produce local channel state information weights; and
    means for multiplying the local channel state information weights and corresponding data symbols.

10. A receiver for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising:
    means for differentially detecting said block synchronization word;
    means for using said block synchronization word to coherently detect said digital signal representative of information to be transmitted;
    means for processing the sequence of timing bits to determine channel state information;
    means for determining channel state information weights;
    means for phase equalizing said data sub-carriers with said channel state information weights;
    means for filtering said data sub-carriers; and
    means for interpolating said data sub-carriers between two of said reference sub-carriers.

11. A receiver for receiving data in a digital audio broadcasting system, said data being modulated on a plurality of orthogonal frequency division multiplexed sub-carriers, said sub-carriers including data sub-carriers and reference subcarriers, said data sub-carriers being modulated with a digital signal representative of information to be transmitted, and said reference sub-carriers being modulated with a sequence of timing bits, said sequence of timing bits including a block synchronization word, said receiver comprising:
- means for differentially detecting said block synchronization word;
- means for using said block synchronization word to coherently detect said digital signal representative of information to be transmitted;
- wherein the means for processing the sequence of timing bits to determine channel state information comprises:
- means for removing timing sequence modulation from the reference subcarriers to produce reference symbols;
- means for producing first signal representative of local phase and amplitude of the reference symbols; and
- means for multiplying the first signal by a second signal representative of noise variance to produce a channel state information signal.

12. A receiver for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising:
- means for differentially detecting said block synchronization word;
- means for using said block synchronization word to coherently detect said digital signal representative of information to be transmitted;
- means for processing the sequence of timing bits to determine channel state information and a phase reference.

13. The receiver of claim 12, further comprising:
- means for phase equalizing said data subcarriers;
- means for filtering said data subcarriers;
- means for interpolating the channel state information over a group of said data sub-carriers between two of said reference sub-carriers to produce local channel state information weights; and
- means for multiplying the local channel state information weights and corresponding data symbols.

14. A transmitter for transmitting data in a digital audio broadcasting system comprising:
- an oscillator for providing a plurality of orthogonal frequency division multiplexed sub-carriers, said sub-carriers including data sub-carriers and reference sub-carriers;
- a modulator for modulating said data sub-carriers with a digital signal representative of information to be transmitted, and for modulating said reference sub-carriers with a sequence of timing bits, said sequence of timing bits including an unambiguous block synchronization word, wherein number of bits comprising said block synchronization word is less than one half of the number of bits in said timing sequence; and
- an antenna for transmitting said orthogonal frequency division multiplexed sub-carriers.

15. The transmitter of claim 14, wherein said reference sub-carriers are differentially encoded.

16. The transmitter of claim 14, wherein said block synchronization word is comprised of:
- a plurality of block synchronization bits positioned in non-contiguous block synchronization fields.

17. The transmitter of claim 14, wherein said block synchronization word is distributed in said sequence of timing bits such that when the bits of said sequence of timing bits are correlated with a known training sequence of bits, there is at least one bit mismatch at every correlation offset except zero.

18. The transmitter of claim 14, wherein said sequence of timing bits further includes:
- a block count field;
- a mode field; and
- a hybrid/digital field.

19. The transmitter of claim 14, wherein the number of bits (L) in said sequence of timing bits is defined as:

$$L \leq 2 \cdot Z \cdot (S-Z)+1,$$

where Z is the number of logic zero bits in said block synchronization word, and S is the number of bits in said block synchronization word.

20. The transmitter of claim 14, wherein the number of logic zero bits in said block synchronization word is equal to the number of logic one bits in said block synchronization word.

21. A receiver comprising:
- an antenna for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word; and
- a demodulator for differentially detecting said block synchronization word, and for using said block synchronization word to coherently detect said digital signal representative of information to be transmitted;
- wherein the block synchronization word is unambiguous and wherein the number of bits comprising said block synchronization word is less than one half of the number of bits in said timing sequence.

22. A receiver comprising:
- an antenna for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word; and
- a demodulator for differentially detecting said block synchronization word, and for using said block synchronization word to coherently detect said digital signal representative of information to be transmitted;
- the demodulator further comprising means for processing the sequence of timing bits to determine channel state information; means for interpolating the channel state information over a group of said data sub-carriers between two of said reference sub-carriers to produce local channel state information weights; and means for multiplying the local channel state information weights and corresponding data symbols.

23. A receiver comprising:
an antenna for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word; and
a demodulator for differentially detecting said block synchronization word, and for using said block synchronization word to coherently detect said digital signal representative of information to be transmitted;
the demodulator further comprising:
    means for determining channel state information weights;
    means for phase equalizing said data sub-carriers with said channel state information weights;
    means for filtering said data sub-carriers; and
    means for interpolating said data sub-carriers between two of said reference sub-carriers.

24. A receiver comprising:
an antenna for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word; and
a demodulator for differentially detecting said block synchronization word, and for using said block synchronization word to coherently detect said digital signal representative of information to be transmitted;
wherein the demodulator further comprises means for processing the sequence of timing bits to determine channel state information; means for removing timing sequence modulation from the reference subcarriers to produce reference symbols; means for producing first signal representative of local phase and amplitude of the reference symbols; and means for multiplying the first signal by a second signal representative of noise variance to produce a channel state information signal.

25. A receiver comprising:
an antenna for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word;
a demodulator for differentially detecting said block synchronization word, and for using said block synchronization word to coherently detect said digital signal representative of information to be transmitted; and
means for processing the sequence of timing bits to determine channel state information and a phase reference.

26. The receiver of claim 25, further comprising:
means for phase equalizing said data subcarriers;
means for filtering said data subcarriers;
means for interpolating the channel state information over a group of said data sub-carriers between two of said reference sub-carriers to produce local channel state information weights; and
means for multiplying the local channel state information weights and corresponding data symbols.

27. A method for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising the steps of:
    differentially detecting said block synchronization word;
    using said block synchronization word to coherently detect said digital signal representative of information to be transmitted;
    processing the sequence of timing bits to determine channel state information;
    interpolating the channel state information over a group of said data sub-carriers between two of said reference sub-carriers to produce local channel state information weights; and
    multiplying the local channel state information weights and corresponding data symbols.

28. A method for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising the steps of:
    differentially detecting said block synchronization word;
    using said block synchronization word to coherently detect said digital signal representative of information to be transmitted;
    processing the sequence of timing bits to determine channel state information;
    determining channel state information weights;
    phase equalizing said data sub-carriers with said channel state information weights;
    filtering said data sub-carriers; and
    interpolating said data sub-carriers between two of said reference sub-carriers.

29. A method for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising the steps of:
    differentially detecting said block synchronization word;
    using said block synchronization word to coherently detect said digital signal representative of information to be transmitted; and wherein the step of processing the sequence of timing bits to determine channel state information comprises the steps of:

removing timing sequence modulation from the reference subcarriers to produce reference symbols;

producing first signal representative of local phase and amplitude of the reference symbols; and multiplying the first signal by a second signal representative of noise variance to produce a channel state information signal.

30. A method for receiving data in a digital audio broadcasting system, said data being modulated on a plurality of orthogonal frequency division multiplexed sub-carriers, said sub-carriers including data sub-carriers and reference sub-carriers, said data sub-carriers being modulated with a digital signal representative of information to be transmitted, and said reference sub-carriers being modulated with a sequence of timing bits, said sequence of timing bits including a block synchronization word, said receiver comprising the steps of:

differentially detecting said block synchronization word;

using said block synchronization word to coherently detect said digital signal representative of information to be transmitted;

processing the sequence of timing bits to determine channel state information and a phase reference;

phase equalizing said data subcarriers;

filtering said data subcarriers;

interpolating the channel state information over a group of said data sub-carriers between two of said reference sub-carriers to produce local channel state information weights; and multiplying the local channel state information weights and corresponding data symbols.

* * * * *

UNITED STATES PATENT AND TRADEMARK OFFICE
CERTIFICATE OF CORRECTION

PATENT NO. : 6,982,948 B2 Page 1 of 1
APPLICATION NO. : 10/342764
DATED : January 3, 2006
INVENTOR(S) : Brian William Kroeger and Jeffrey S. Baird It is certified that error appears in the above-identified patent and that said Letters Patent is hereby corrected as shown below:

Column 1, Line 10
"patent application" should read -- Patent Application --

Column 10, Line 1
"$a*$" should read -- $\hat{a}*$ --

Signed and Sealed this

Fifth Day of September, 2006

JON W. DUDAS
*Director of the United States Patent and Trademark Office*